Patented Sept. 11, 1923.

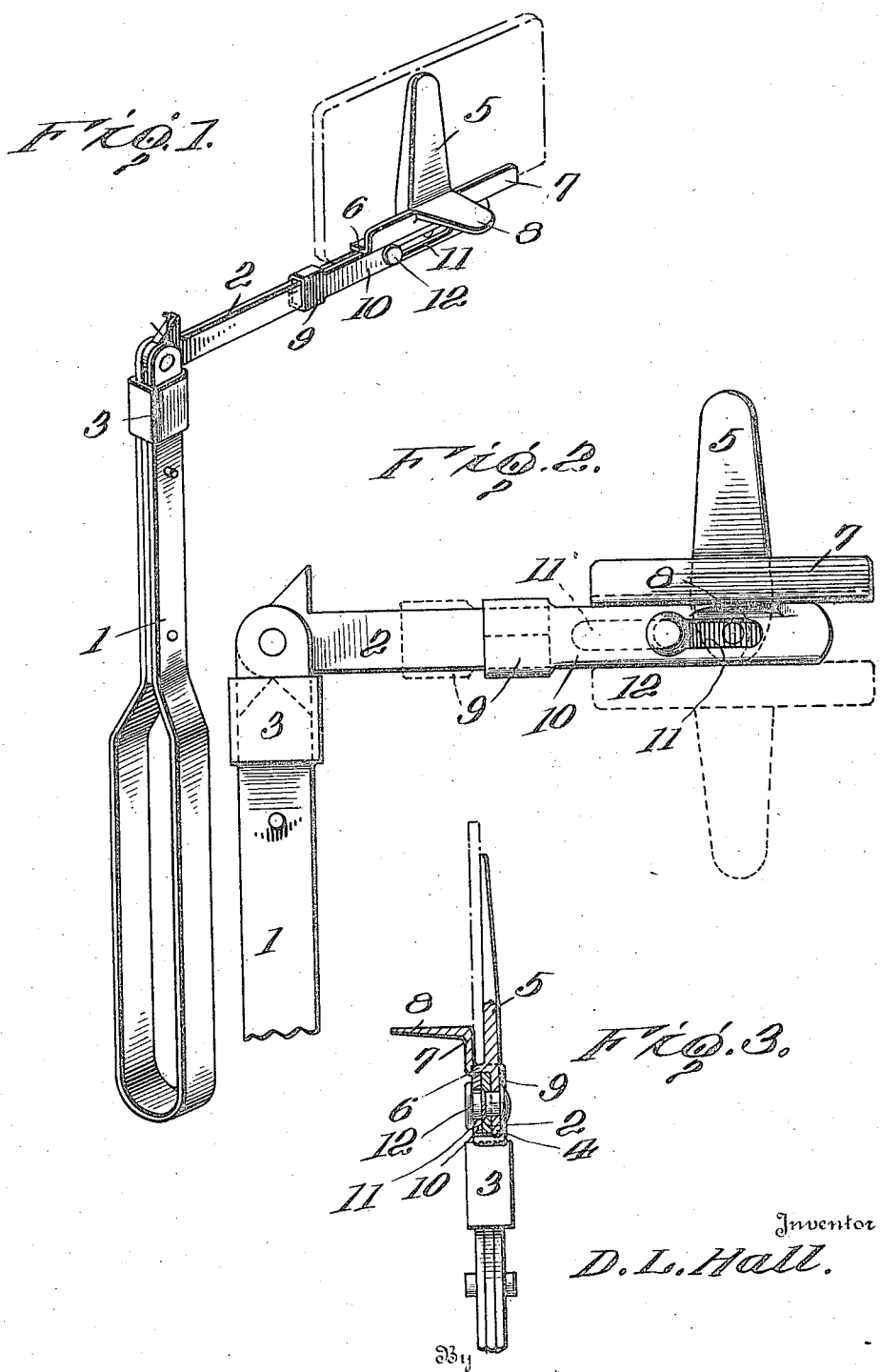

1,467,850

UNITED STATES PATENT OFFICE.

DANIEL L. HALL, OF COLUMBIA, SOUTH CAROLINA.

DENTAL FILM HOLDER.

Application filed December 15, 1921. Serial No. 522,661.

*To all whom it may concern:*

Be it known that I, DANIEL L. HALL, a citizen of the United States, residing at Columbia, in the county of Richland and State of South Carolina, have invented certain new and useful Improvements in Dental Film Holders, of which the following is a specification, reference being had therein to the accompanying drawing.

This invention relates to certain new and useful improvements in dental film holders in making radiographs of teeth and is a continuation in part of my application for dental film holders, filed September 12, 1921, Serial No. 499,934, the object being to provide means for locking a film pack holder in adjusted position on its supporting arm.

Another object of the invention is to provide a consruction of locking means which is very simple and cheap and one which can be quickly adjusted so as to be moved into and out of the path of travel of the pack holder so as to allow the same to be adjusted and locked in its adjusted position.

Other and further objects and advantages of the invention will be hereinafter set forth and the novel features thereof defined by the appended claims.

In the drawings,

Figure 1 is a perspective view of a dental film holder constructed in accordance with my invention showing the locking means for the film pack;

Figure 2 is a detailed elevation showing the film pack locked in its adjusted position; and Figure 3 is a section taken on line 3—3 of Figure 1.

In the drawing 1 indicates a handle and 2 a pivoted arm which is locked by a locking collar 3 in its adjusted position. Pivotally mounted on the end of the arm 2 is a film pack holder 4 composed of a vertical member 5 against which the film pack is adapted to be placed, said member having a lateral projection 6 forming a support for the lower edge of the film pack, said lateral projecting portion being provided with a flange 7 for holding the film against the member 5. Extending laterally from the flange 7 is a projection 8 which is adapted to engage the teeth so as to position the film pack within the mouth of the patient while making the radiograph.

The construction of the film holder so far described is identical with the construction disclosed in the above referred to application, as my present invention consists in providing means for locking the film pack holder in its adjusted position.

Slidably mounted on the arm 2 is a collar 9 which has a projection 10 slotted as shown at 11, through which extends a headed pin 12 for guiding and limiting the movement of said projection in respect to the film pack holder and it will be seen that when the collar is moved inwardly on the arm, the end thereof will be moved out from under the lateral projection 6 so as to allow the film pack to be swung to either side of the arm and when the collar is moved outwardly on the arm 2, the projecting end 10 extends under the lateral projection 6 so as to hold the film pack rigidly in either position.

From the foregoing description it will be seen that I have provided a film holder with an adjustably mounted arm having an adjustably mounted film pack holder in connection with means for locking said holder on said arm to either side thereof.

What I claim is:—

1. A film pack holder comprising a handle, an arm pivotally mounted on said handle and mounted to swing in the plane of the handle, a film pack holder carried by the free end of said arm and mounted to swing in the plane of the arm and means movably mounted on said arm for locking said film pack holder in adjusted position on said arm.

2. A film pack holder comprising a handle having a pivoted arm, a film pack supporting member pivotally mounted on said arm and a locking member movably mounted on said arm for holding said film pack in adjusted position, said arm and film pack supporting member being mounted to swing in the same plane.

3. A film pack holder comprising a handle having an arm pivotally mounted thereon, a film pack holder pivotally mounted on the free end of said arm and a locking member slidably mounted on said arm adapted to be moved into and out of the path of travel of said film pack holder for locking said film pack holder to either side of said arm.

4. A film pack holder comprising a handle having a pivotally mounted arm, a film pack holder pivotally mounted on the free end of said arm having a lateral projection and a sliding locking member mounted on said arm adapted to extend under said lateral projection of said film pack holder.

5. In a film holder, the combination with a supporting arm, of a film pack holder pivotally mounted on said arm having a lateral projection, a collar slidably mounted on said arm having a projection capable of being moved under said lateral projection of said film pack holder for locking said film pack in adjusted position.

In testimony whereof I hereunto affix my signature.

DANIEL L. HALL.